Oct. 13, 1959

J. F. NAYLOR 2,908,234

BAKERS' AND THE LIKE OVENS

Filed June 13, 1955

Inventor
Joseph Francis Naylor
By
Attorney

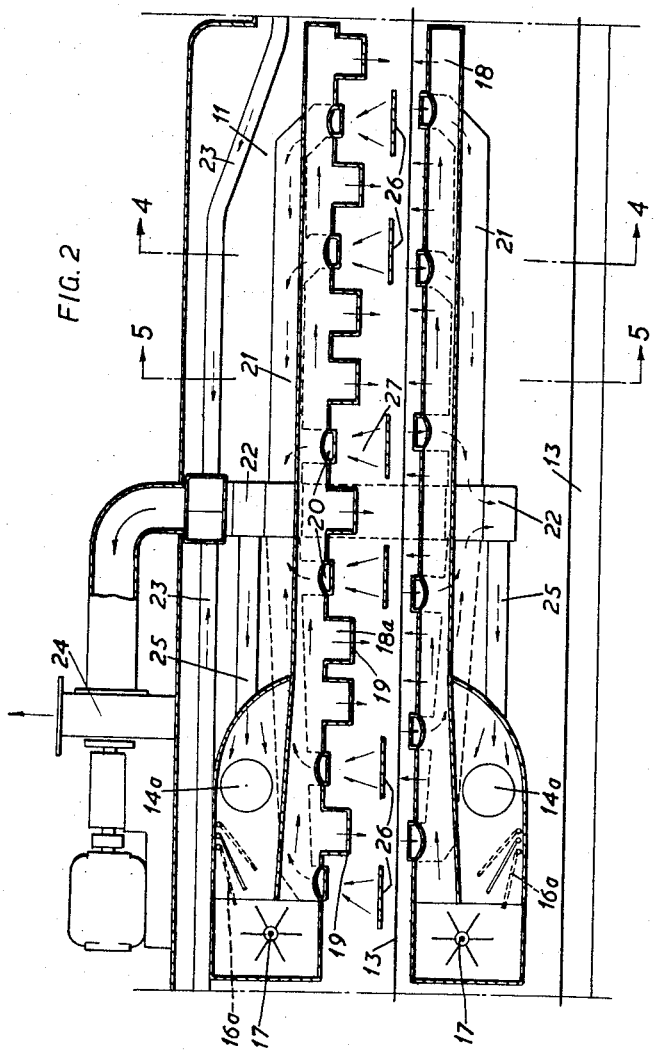

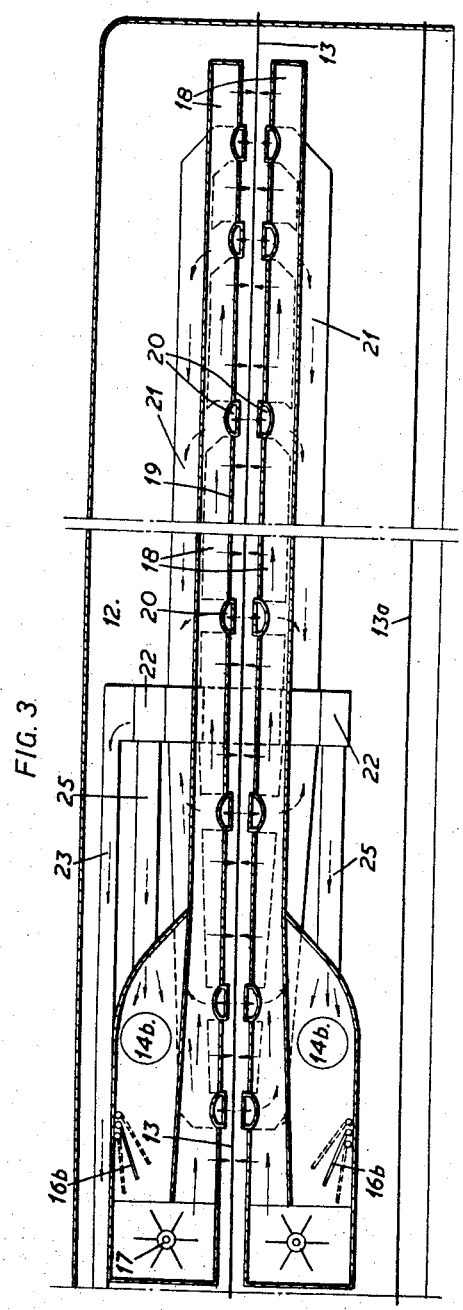

Oct. 13, 1959  J. F. NAYLOR  2,908,234
BAKERS' AND THE LIKE OVENS
Filed June 13, 1955  6 Sheets-Sheet 4
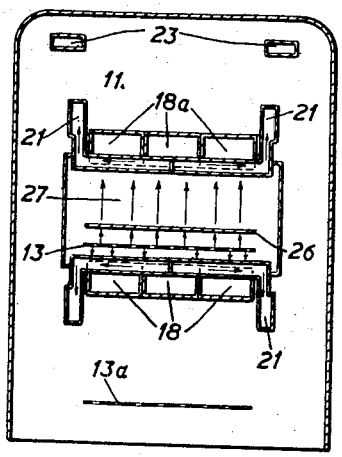
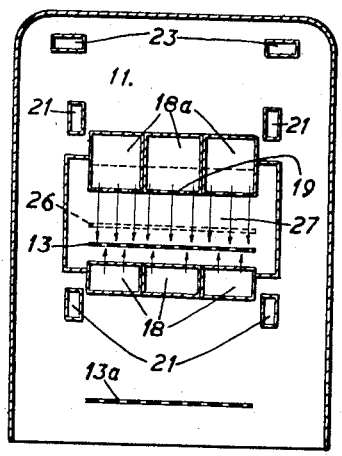
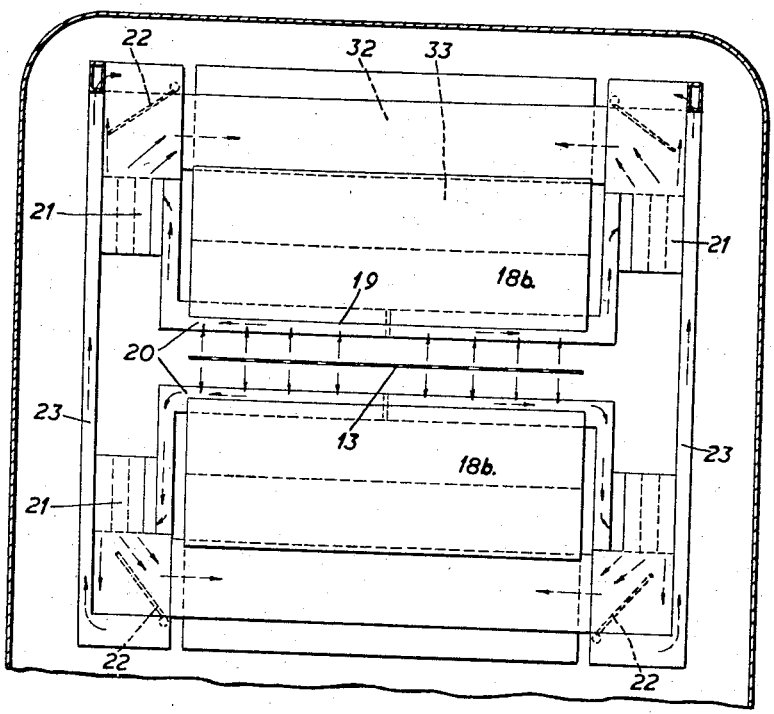
Inventor
Joseph Francis Naylor
By
Attorney Oct. 13, 1959  J. F. NAYLOR  2,908,234
BAKERS' AND THE LIKE OVENS
Filed June 13, 1955  6 Sheets-Sheet 5
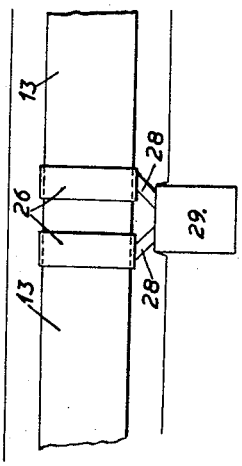
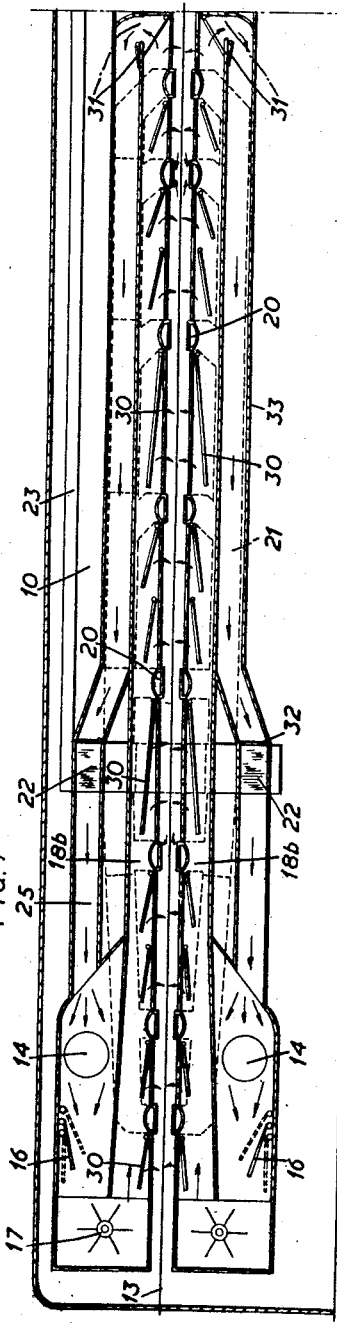
Inventor
Joseph Francis Naylor
By
Attorney Oct. 13, 1959 J. F. NAYLOR 2,908,234
BAKERS' AND THE LIKE OVENS
Filed June 13, 1955 6 Sheets-Sheet 6
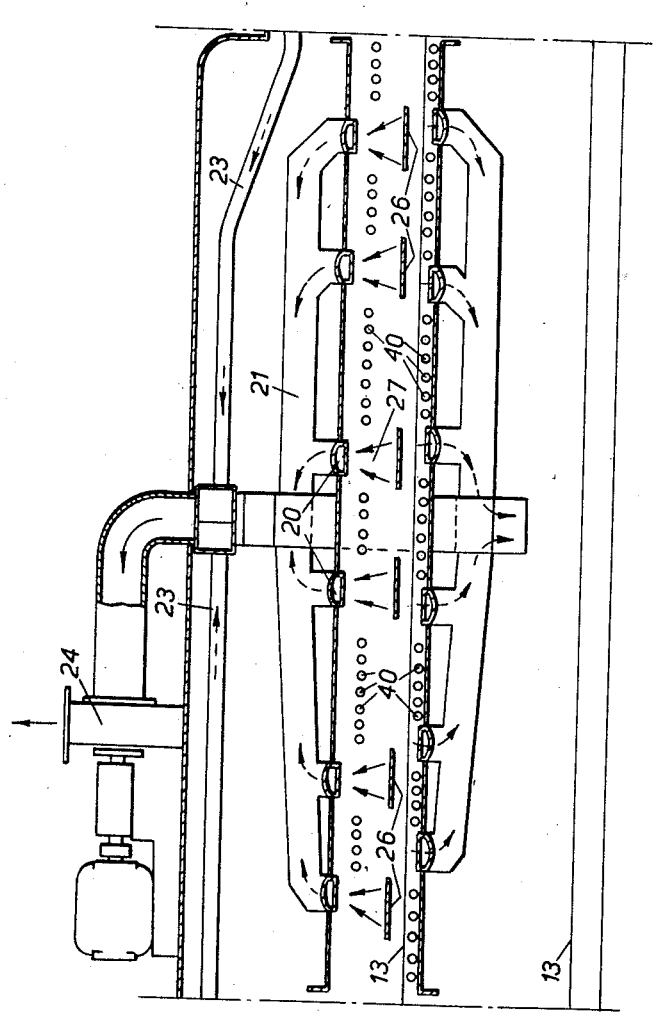
—FIG. 9.—
JOSEPH F. NAYLOR
INVENTOR
BY
ATTORNEY

2,908,234

BAKERS' AND THE LIKE OVENS

Joseph Francis Naylor, Earlestown, Newton-le-Willows, England, assignor to T. & T. Vicars Limited, Earlestown, Newton-le-Willows, a British company Application June 13, 1955, Serial No. 515,193

Claims priority, application Great Britain June 12, 1954

2 Claims. (Cl. 107—55)

The present invention relates to the baking of dough products.

It is recognised throughout the baking industry that it is most essential for products being baked to have a good texture. Each should be uniformly baked throughout its depth or thickness, and when baking has been completed it must have a good bloom or color. The primary object of the present invention is to ensure that not only are these essential requirements met, but in addition the apparatus provided for the purpose achieves a reduction in the baking period.

According to the present invention the oven is divided into three zones of substantially equal length through which the products undergoing baking are successively passed; with heating in the first zone being under the control of one or more units heating by way of radiation, forced convection or both to provide a spring or rise in the products; baking in the second zone being achieved by a high frequency electric field; and the products being heated in the third zone by way of radiation, forced convection or both from one or more heating units to receive the required colour or bloom; and with the heating units in the respective zones being independent of each other.

If desired the heating in a high-frequency electric field in the second zone may be supplemented by additional radiant or convection heating.

The expression "zones of substantially equal length" is intended to include zones in which the effective length of travel of the products therethrough is equal, whether this be by way of a single or a multiple flight conveyor.

The invention is more particularly described with reference to the accompanying drawings which illustrate ovens embodying the invention by way of example and in which:

Figures 1–3 respectively are side elevational views of three zones of an oven, through which the dough products are successively passed on an endless conveyor common to all three zones for heating by forced convection, for baking by high frequency electric current and for final heating by forced convection.

Figure 4 is a sectional view taken along the line 4—4 of Figure 2.

Figure 5 is a sectional view taken along the line 5—5 of Figure 2.

Figure 6 is a detail showing in plan view a pair of high frequency electrodes used in the second zone of the oven illustrated in Figure 2.

Figure 7 is a side elevational view of a modified form of construction of the first or the third zone of an oven wherein forced convection heating may be replaced at the will of the operator by radiant heating.

Figure 8 is a transverse sectional view of the modified form of oven illustrated in Figure 7.

Figure 9 is a side elevational view similar to that of Figure 2, but illustrating a modified form of construction of the second zone of the oven.

Figure 1:
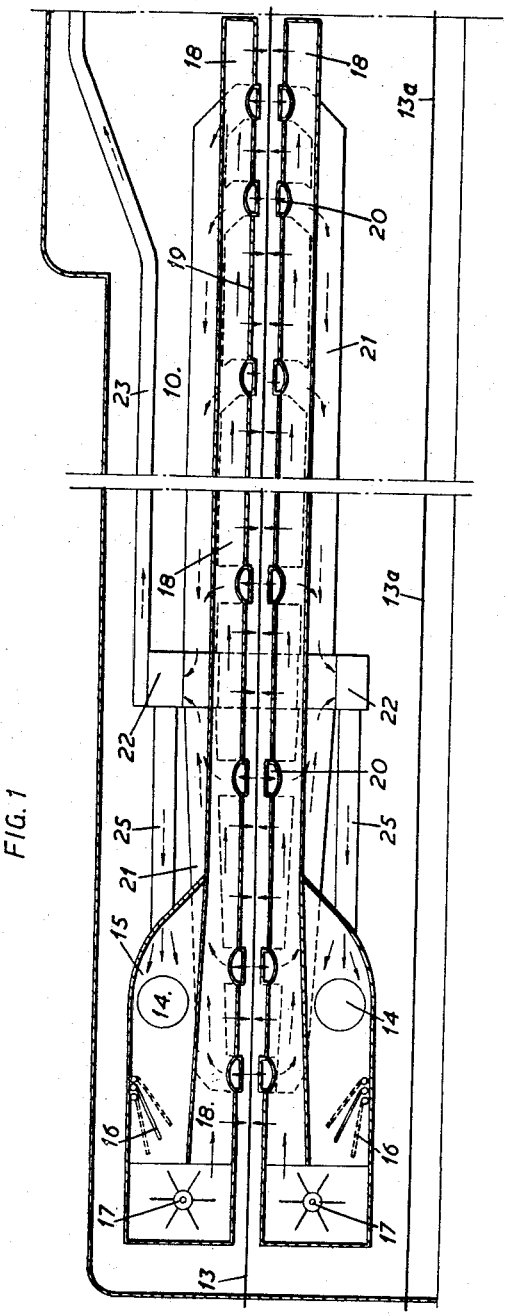

In the ovens embodying the invention as illustrated in the drawings, the dough products to be baked are passed successively through the three zones of an oven, respectively illustrated at 10, 11 and 12 on the upper run of a continuously moving endless conveyor 13 which conveniently is in the form of a solid steel band, or a woven-wire-mesh web, which is disposed on and guided in well known manner by end drums (not shown) of suitable diameter and may be separately supported at intermediate intervals throughout its length. The return or lower run of the conveyor is shown at 13a.

The zone 10 adjacent the feed or intake end of the oven may be heated by any of the normal fuels, such as gas, electricity or oil, with the flexibility of control commensurate with particular requirements determined primarily by the nature of the products to be baked, and the required texture is attained as the products, conveniently arranged in rows on the conveyor, reach the end of the first zone.

The zone 10 which is illustrated in Figure 1, is provided with gas burners 14 located both above and below the upper run 13 of the conveyor in supply ducts 15 located side by side across the oven. In the construction illustrated in Figure 1, the width of the oven is taken up by three ducts 15 while the gases or products of combustion are fed from the burners 14 through heat balancing dampers 16 provided one for each duct, and through fans 17 into similar ducts 18 extending side by side over substantially the whole length of the oven zone 10. From the ducts 18 the gases pass through jets or perforations provided in the wall 19 thereof into the oven chamber where they contact the dough products on the conveyor 13 as shown by the arrows and thence proceed into return ducts 20, and manifolds 21 at the sides of the oven to a damper control, such as, the pivoted dampers 22 in Figure 8, where a predetermined proportion of the gases, dependent upon the desired dryness factor of the oven atmosphere, is spilled along ducts 23 to a power driven extraction or exhaust fan 24 shown in Figure 2 and the remainder is returned along ducts 25 to the burners 14 in the supply ducts 15. It will of course be appreciated that the required volume of air and gases in the substantially closed circuit described above for heating the dough products by forced convection, is maintained by the admission of additional air to the circuit, conveniently at the burners 14. It will also be seen from Figure 1 that the substantially closed circuits are provided both above and below the conveyor in order to ensure that top and bottom convection heating is applied to the products when passing through the zone 10.

In passing through the second zone 11 of the oven the dough products are baked in a high frequency field and, for this purpose, the conveyor 13 passes beneath the high frequency electrodes in the form of plates or grids 26 within a baking chamber 27. These grids may be suspended or otherwise supported within the oven chamber by means of appropriate electric insulators and extend across the full width of the conveyor, as is shown in Figure 6, where an adjacent pair of plates are connected to leads 28 extending to a high frequency generator 29 capable of providing the required electric current. These plates or grids 26 are spaced apart along the length of the baking chamber 27 at distances which are selected to suit particular requirements and cooperate with grounded electrodes formed by the band or wire mesh used as the conveyor 13.

Apart from being baked in a high frequency field while passing through the zone 11 the dough products are also submitted to heat treatment by forced convection in a manner similar to that of the heat treatment received in the first zone 10 but with burners 14a and dampers 16a of the second zone operating quite independently of the burners and dampers of the first zone. As a result, surface moisture formed on the dough products during baking is converted into steam and removed from the baking chamber 27 by the forced convection currents of the substantially closed circuit in zone 11.

From Figure 2 of the drawings it will be seen that, in the second zone, upper ducts 18a for leading the gases of combustion from the fans into the oven chamber 27 above the conveyor 13 are disposed at a higher level than the upper ducts 18 of the first zone, and that the lower walls of the ducts 18a are castellated with their perforated parts 19, through which the gases pass from the ducts 18a into the upper part of the baking chamber 27, being located nearer the conveyor 13 than the remaining parts of the walls in which the return ducts 20 are provided. The lower ducts 18 in zone 11 are similar to those of zone 10.

It will be appreciated, however, that instead of supplementing the high frequency baking treatment in the second zone 11 by a substantially closed circuit of gases which in part heat the baking chamber 27 by way of forced convection, such high frequency baking may be accompanied by radiant heat treatment, which may for example be provided by infra-red rays from radiant heating elements represented diagrammatically at 40 on Figure 9.

The final zone 12, where either a crust is formed on the products or they have color imparted to them as a result of the heat treatment received in said zone, has heating means similar to that of the first zone 10. Thus in the oven zone illustrated in Figure 3 the products are heated by forced convection as in Figure 1, but by gases heated by burners 14b which are wholly independent of the burners 14 of Figure 1, as are also the dampers 16b.

Figures 7 and 8 illustrate a modified form of oven construction for either the first or third zones by which, entirely at the will of the operator, forced convection heating may be replaced by heating by way of radiation. For this purpose upper and lower ducts 18b, arranged side by side as in the case of the ducts 18, and which receive heated air from the burners 14 under the control of the heat balancing dampers 16 and the fans 17 in each oven zone 10 or 11 as the case may be, have groups of perforations in their walls facing the conveyor 13, these groups being spaced apart at predetermined distances substantially over the entire length of the ducts, and being controlled by pivotal deflector plates 30 mounted on transverse shafts and located within the ducts with distances therebetween equal to that between the successive groups of perforations. These pivotal deflector plates 30 under the control of means (not shown) located externally of a side of the oven at the ends of the transverse shafts carrying the plates 30 are adapted to be angularly displaced about their pivots by progressively increased amounts from the inlet end of each duct 18b to the exit end so as to act as damper controls for the passage of the gases or products of combustion through the groups of perforations.

Pivotal dampers 31 are provided at the rear ends of the ducts 18b and are adapted for angular displacement about shafts on which they are mounted through an arc of substantially 180° between positions at which they respectively fully open and fully close said ducts 18b to and from communcation with return manifolds 33. The fully open position of the dampers 31 is shown in full lines in Figure 7.

Similar pivotal dampers 32 are provided at the other ends of the return manifolds 33 where the latter meet the spill ducts 23 to close the manifolds 33 when the dampers 31 are closed and vice versa. As a result of the foregoing, when the deflector plates 30 are in their closed positions covering the perforations of each duct 18b and the dampers 31, 32 are open, the gases or products of combustion passing along the ducts 18b are prevented from entering the baking chamber and are made to return to the burners 14 through dampers 31, along the return manifolds 33, through the dampers 32, and the ducts 25, with a selected portion of the volume of gases proceeding to spill ducts 23 under the control of the pivotal dampers 22. In the above case, the ducts 18b operate as radiators, that is to say heating in the zone 10 or 12 is effected by way of radiation alone, and the damper controlled return ducts 20 merely operate to withdraw oven atmosphere to meet particular requirements.

When, however, it is desired to convert the system to heating by forced convection, the dampers 31, 32 are closed and the deflector plates 30 are opened by progressively increasing amounts from the inlet to the outlet end of the ducts 18b, thereby enabling gases or products of combustion passing along the ducts 18b to enter the baking chamber and heat the dough products on the conveyor by forced convection, in which case the return flow of the gases and oven atmosphere combined is through the damper controlled return ducts 20, the return manifolds 21, shown in dotted lines in Figure 7, and the ducts 25 as described with reference to Figure 1, i.e. with a predetermined portion of the mixture of gases and oven atmosphere being discharged through the spill ducts 23.

Clearly this selective operation of the heat treatment as illustrated in Figures 7 and 8 may similarly be utilised in the second zone 11 of the oven, i.e. as additional heat treatment to that imparted by the high frequency field.

It will be appreciated that changes in the details, which have been herein described and illustrated for the purpose of explaining the nature of the invention, may be made by those skilled in the art without departing from the principle and scope of the invention as determined by the appended claims.

I claim:

1. An oven for baking dough products comprising an elongated tunnel structure having successive first, second and third baking zones of substantially equal length; means for conveying dough products successively through said zones; each of said zones having a plurality of ducts extending the entire length of the related zone and arranged side-by-side both above and below the path of said conveying means, each of said ducts having groups of perforations spaced apart along the length of the duct and opening toward said conveying means, a supply duct communicating with one end of each of the first mentioned ducts, heating means in each supply duct, fan means between each supply duct and the related first ducts to cause forced circulation of gases past said heating means and along said first ducts for issuance through said groups of perforations to heat the dough products by convection, exhaust ducts opening at spaced apart locations along said zones of said tunnel structure above and below the path of said conveying means, manifolds extending along the opposite sides of said oven structure and communicating with said exhaust ducts to receive gases exhausted through the latter, damper control means connected to said manifolds, conduits extending from said damper control means to said supply ducts to return to the latter a portion of the exhausted gases determined by said damper control means, and spill ducts extending from said damper control means to discharge the remainder of the exhausted gases; each of said first and third zones further having deflector plates pivotally mounted in each of said first ducts to move between closed positions covering said groups of perforations, so that the heated gases circulated through said first ducts heat the dough products only by radiation from said first ducts, and inclined open positions where said deflector plates direct portions of the circulated gases out through said perforations to heat the dough products by convection, return ducts extending from the opposite ends of said first ducts to said damper control means, and dampers between said return ducts and said first ducts and said damper control means respectively, to isolate said first ducts from said damper control means when said deflector plates are open for heating by convection and to permit the flow of the heated gases from said first ducts to said damper control means when said deflector plates are closed for heating by radiation; said second zone further having electrodes extending thereacross above said conveying means at locations spaced apart along said second zone, and high frequency generating means connected to said electrodes so that the dough products passing through said second zone are baked in a high frequency field.

2. An oven as in claim 1; wherein said first ducts in said second zone above said path of the conveying means have bottom walls with castellated portions, said high frequency electrodes being disposed adjacent portions of said bottom walls intermediate said castellated portions thereof and said exhaust ducts communicating with said second zone in the regions intermediate said castellated portions, and said groups of perforations being located in said castellated portions.

References Cited in the file of this patent

UNITED STATES PATENTS

| | | |
|---|---|---|
| 2,454,370 | Beaubien | Nov. 23, 1948 |
| 2,491,687 | Nutt | Dec. 20, 1949 |

FOREIGN PATENTS

| | | |
|---|---|---|
| 631,395 | Great Britain | Nov. 2, 1949 |
| 713,271 | Great Britain | Aug. 11, 1954 |